(12) United States Patent
Matsunaga et al.

(10) Patent No.: US 12,281,937 B1
(45) Date of Patent: Apr. 22, 2025

(54) IMAGE SENSOR INCLUDING PEAK HOLD CIRCUIT

(71) Applicant: OmniVision Technologies, Inc., Santa Clara, CA (US)

(72) Inventors: Yoshiyuki Matsunaga, Kyoto (JP); Keiji Mabuchi, Cupertino, CA (US); Lindsay Grant, Campbell, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 18/542,439

(22) Filed: Dec. 15, 2023

(51) Int. Cl.
*G01J 1/44* (2006.01)
(52) U.S. Cl.
CPC ........... *G01J 1/44* (2013.01); *G01J 2001/446* (2013.01)
(58) Field of Classification Search
CPC ............................. G01J 1/44; G01J 2001/446
See application file for complete search history.

(56) References Cited

U.S. PATENT DOCUMENTS

| | | | |
|---|---|---|---|
| 6,201,270 B1* | 3/2001 | Chen | H04N 25/677 327/515 |
| 11,196,947 B2 | 12/2021 | Ni | |
| 2004/0036009 A1* | 2/2004 | Takayanagi | H01L 27/1463 348/E5.081 |
| 2013/0107331 A1* | 5/2013 | Mori | H04N 25/78 358/482 |

OTHER PUBLICATIONS

Yang Ni, "QLOG—logarithmic CMOS pixel with single electron detection capability"; New Imaging Technologies, Impasse de la Noisette, 91370 Verrierres le Buisson Cedex France.

* cited by examiner

*Primary Examiner* — Jennifer D Bennett

(57) ABSTRACT

A pixel circuit includes: a photodiode configured to operate in a photovoltaic mode and to accumulate charges corresponding to an incident light amount; a reset transistor configured to reset the accumulated charges of the photodiode; and a peak hold circuit configured to hold an output corresponding to the accumulated charges of the photodiode, the peak hold circuit including a peak hold transistor connected to an output end of the photodiode, a switching transistor configured to turn on/off an output of the peak hold transistor, and a holding capacitor configured to hold an output of the switching transistor. The peak hold transistor operates in a state where no carrier charge or only one carrier charge is present on a channel.

7 Claims, 11 Drawing Sheets

(strong inversion)

(weak inversion)

IMAGE SENSOR INCLUDING PEAK HOLD CIRCUIT

TECHNICAL FIELD

The present disclosure generally relates to a pixel circuit and an image sensor each including a photodiode that operates in a photovoltaic mode and accumulates charges corresponding to an incident light amount, and a peak hold circuit.

BACKGROUND INFORMATION

A photodiode used for an image sensor normally operates in a logarithmic region where the photodiode operates with a forward bias and shows a logarithmic response to incident light, and a linear region where the photodiode operates with a reverse bias and a part of the forward bias and shows a linear response to the incident light.

An example has disclosed a pixel circuit using such a photodiode. The pixel circuit includes a peak hold circuit that holds a peak of an output of the photodiode, thereby removing a flicker caused by an LED light source.

As described above, when the peak hold circuit is provided, a peak hold transistor performs floating gate operation. Therefore, noise is increased due to positive feedback.

SUMMARY

A pixel circuit according to the present disclosure, includes: a photodiode configured to operate in a photovoltaic mode and accumulate charges corresponding to an incident light amount; a reset transistor configured to reset the accumulated charges of the photodiode; and a peak hold circuit configured to hold an output corresponding to the accumulated charges of the photodiode, the peak hold circuit including a peak hold transistor connected to an output end of the photodiode, a switching transistor configured to turn on/off an output of the peak hold transistor, and a holding capacitor configured to hold an output of the switching transistor. The peak hold transistor operates in a state where no carrier charge or one carrier charge is present on a channel.

An image sensor according to the present disclosure includes: a plurality of pixels; a plurality of analog-to-digital converters; and a horizontal scan circuit. Each of the pixels includes (1) a photodiode configured to operate in a photovoltaic mode and to accumulate charges corresponding to an incident light amount, (2) a reset transistor configured to reset the accumulated charges of the photodiode, (3) a peak hold circuit configured to hold an output corresponding to the accumulated charges of the photodiode, where the peak hold circuit includes (i) a peak hold transistor connected to an output end of the photodiode, (ii) a switching transistor configured to turn on/off an output of the peak hold transistor, and (iii) a holding capacitor configured to hold an output of the switching transistor, and (4) a source follower circuit configured to output a voltage held in the holding capacitor of the peak hold circuit as a signal voltage. The peak hold transistor operates in a state where no carrier charge or only one carrier charge is present on a channel. The plurality of analog-to-digital converters convert the respective signal voltages output from the source-follower circuits of the plurality of pixels into digital signals. The horizontal scan circuit serially outputs the digital signals.

According to the pixel circuit and the image sensor of the present disclosure, positive feedback noise may be suppressed by limiting movement of the charges in the peak hold transistor.

BRIEF DESCRIPTION OF THE DRAWINGS

Embodiments of the present disclosure will be described based on the following figures, wherein.

DESCRIPTION OF EMBODIMENTS

Embodiments of the present disclosure are described below with reference to drawings. The following embodiments do not limit the present disclosure, and configurations obtained by selectively combining a plurality of illustrations are also included in the present disclosure.

Configuration of Pixel Circuit

Figure 1:
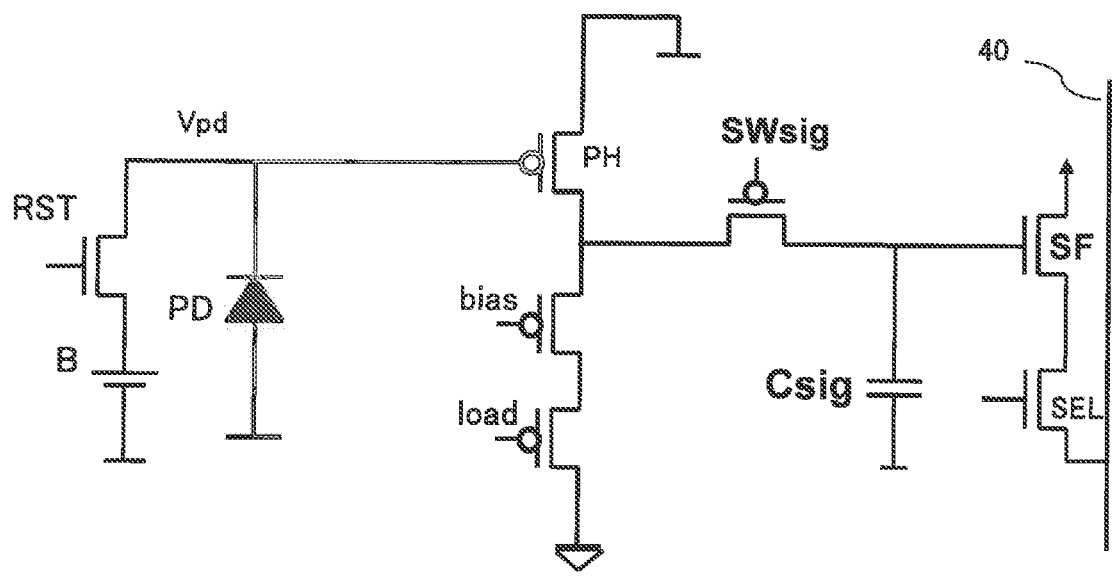
FIG. 1 is a diagram illustrating a configuration of a pixel circuit as a premise of the present disclosure.

FIG. 1 is a diagram illustrating a configuration of a pixel circuit as a premise of the present disclosure.

A photodiode PD accumulates charges (electrons in this case) based on incident light. A cathode of the photodiode PD serves as an output end, and an anode is connected to a power supply (e.g., ground). Therefore, an output voltage Vpd of the photodiode PD is an output signal.

One end (drain) of a reset transistor RST is connected to the cathode of the photodiode PD, and the other end (source) of the reset transistor RST is connected to a power supply (e.g., ground) through a reset power supply B. In this example, the reset transistor RST is an n-channel transistor.

The cathode of the photodiode PD is connected to a gate of a peak hold transistor PH. The peak hold transistor PH is a p-channel transistor. A drain of the peak hold transistor PH is connected to a power supply (e.g., ground). A peak hold circuit includes the peak hold transistor PH and a holding capacitor Csig. In an example in FIG. 1, the peak hold circuit further includes a bias transistor bias, a load transistor load, and a switch transistor SWsig.

A source of the switch transistor SWsig is connected to a source of the peak hold transistor PH. One end of the holding capacitor Csig is connected to a drain of the switch transistor SWsig. The other end of the holding capacitor Csig is connected to a power supply (e.g., ground). The switch transistor SWsig is a p-channel transistor.

The drain of the switch transistor SWsig is connected to a gate of a source follower transistor SF. A drain of the source follower transistor SF is connected to a power supply, and a source is connected to a drain of a selection transistor SEL. A source of the selection transistor SEL is connected to an output line 40.

The source of the peak hold transistor PH is also connected to a power supply through the bias transistor and the load transistor. The bias transistor and the load transistor are p-channel transistors.

A gate voltage of the load transistor load is set to a direct-current voltage at which the peak hold transistor PH performs source follower operation. To inject holes into the holding capacitor Csig, a negative pulse is applied to the bias transistor bias.

A row selection signal is supplied to a gate of the selection transistor SEL. When the row selection signal becomes an H level, a signal corresponding to a gate voltage of the readout source follower transistor SF is output to the output line 40.

After the reset transistor RST is turned on to reset the photodiode PD, the bias transistor and the switch transistor SWsig are turned on to inject charges (holes) into the holding capacitor Csig.

Thereafter, the bias transistor is turned off to discharge excess charges through the peak hold transistor PH. As a result, the holding capacitor Csig is put into a reset state. In this state, a signal supplied from the peak hold transistor PH is accumulated in the holding capacitor Csig through the switch transistor SWsig during one frame period. As described above, the output voltage corresponding to the accumulated charges of the photodiode PD is supplied to the gate of the peak hold transistor PH. Therefore, charges corresponding to the incident light amount of the photodiode PD during one frame period are accumulated in the holding capacitor Csig.

Further, when the switch transistor SWsig is turned off and the selection transistor SEL is turned on, a voltage signal corresponding to the charges accumulated in the holding capacitor Csig is read out to the output line 40.

In this example, the gate of the peak hold transistor PH is just connected to the output end of the photodiode. Therefore, the gate of the peak hold transistor PH is in a floating state, and the peak hold transistor PH performs floating gate operation. Thus, noise is increased due to positive feedback.

Note that, in the present embodiment, a MOSFET is used as the transistor.

Figure 2:
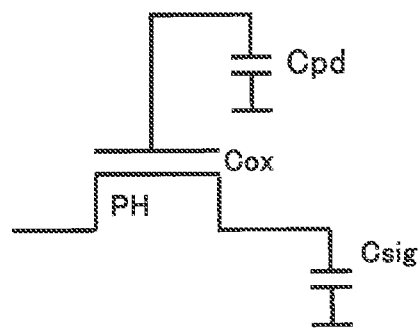
FIG. 2 is a diagram illustrating capacitances around a peak hold transistor PH.

FIG. 2 illustrates capacitances around the peak hold transistor PH. In this example, an n-type channel in which carriers of the peak hold transistor PH are electrons is described. In a case of a p-type channel, carriers are holes, and polarities of the potential are reversed in the drawing.

As illustrated, a capacitance Cpd of the photodiode PD is connected to the gate of the peak hold transistor PH, and the holding capacitor Csig is connected to the source. Further, the peak hold transistor PH includes a gate capacitance Cox.

Figure 3A:
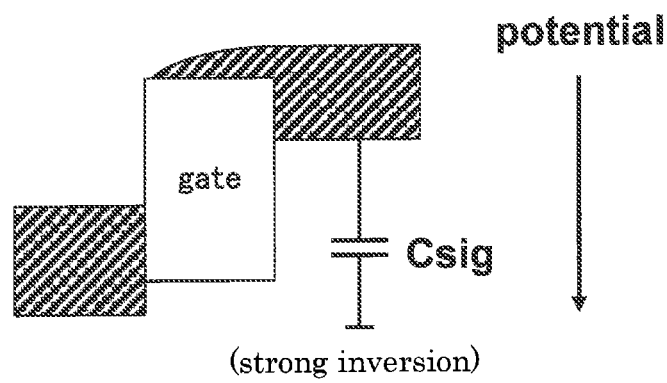
FIG. 3A is a diagram illustrating a state of a potential in a strong inversion state of the peak hold transistor PH.
Figure 3B:
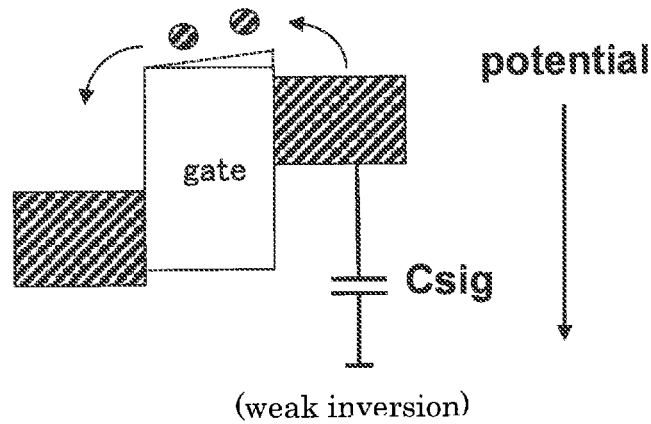
FIG. 3B is a diagram illustrating the state of the potential in a weak inversion state of the peak hold transistor PH.

FIG. 3A and FIG. 3B are diagrams each illustrating a state of a potential of the peak hold transistor PH. FIG. 3A illustrates the potential in a strong inversion state, and FIG. 3B illustrates the potential in a weak inversion state. In the drawings, the potential is minus on an upper side, and is plus on a lower side.

As illustrated, in the strong inversion state where a gate voltage Vg exceeds a threshold voltage Vt, the potential on the holding capacitor Csig side further shift the minus side, and the charges (electrons) flow toward the power supply over a barrier of the gate. In contrast, in the weak inversion state where the gate voltage Vg does not exceed the threshold voltage Vt, the potential on the holding capacitor Csig is lower than the barrier of the gate, and a few charges (electrons) stochastically flow toward the power supply over the barrier of the gate.

Noise characteristics of the peak hold circuit including the peak hold transistor PH and the holding capacitor Csig are described. Noise in a case where the gate voltage is fixed and a noise band is limited is denoted by N. In addition, a Boltzmann constant is denoted by k, and an absolute temperature is denoted by T.

Strong Inversion State

In the strong inversion state, in a limited band (in-phase) where the noise is limited to be less than or equal to a cutoff frequency fc, the noise N is expressed as follows, $(1+A)*N$, where $A=(2/3)*Cox/Cpd$.

Further, in a full band where the frequency is not limited, the noise N is expressed as follows, $(1+A)^{1/2}*[(2/3)*kT/Csig]^{1/2}$.

Weak Inversion State

In the weak inversion state, in the limited band (in-phase) where the frequency band is limited to be less than or equal to the cutoff frequency fc, the noise N is expressed as follows, $(1+A)*N$, where $A=(1/2)*Cox/Cpd$.

Accordingly, the noise is amplified by (1+A) times by the peak hold circuit.

Further, in the full band where the frequency band is not limited, the noise is expressed as follows, $(1+A)^{1/2}*[(1/2)*kT/Csig]^{1/2}$.

In the limited band (where frequency band is limited to be less than or equal to cutoff frequency fc), the noise is amplified by (1+A) times by the peak hold circuit. This is because the peak hold circuit performs in-phase operation to cause the positive feedback. In contrast, at a frequency greater than or equal to the cutoff frequency fc, the positive feedback does not occur because the phase is rotated by 90 degrees. Accordingly, in the full band, the noise is amplified by (1+A) 1/2 times. Note that, as described above, the value "A" is different between the strong inversion state and the weak inversion state.

Figure 4:
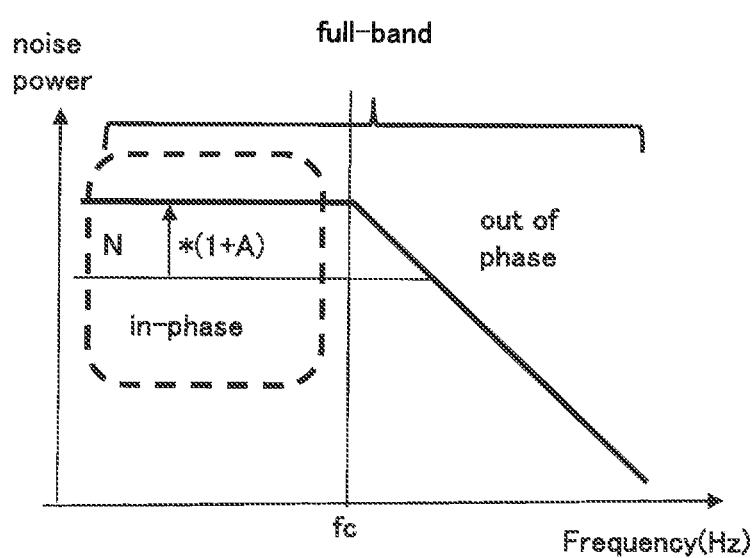
FIG. 4 is a diagram illustrating relationship between a frequency and noise power.

FIG. 4 is a diagram illustrating relationship between the frequency and noise power. As illustrated, at the frequency less than or equal to the cutoff frequency fc, the noise is increased. At the frequency greater than or equal to the cutoff frequency, the noise is reduced.

Note that whether the peak hold circuit performs limited band operation or full band operation is determined by a circuit on a subsequent stage and signal processing.

As described above, when the peak hold circuit including the peak hold transistor PH and the holding capacitor Csig is provided, the noise increased due to the positive feedback.

Embodiment 1

According to noise analysis, in a case where only one carrier charge (hereinafter, simply referred to as charge) is present on a channel of the peak hold transistor PH or in a case where no charge is present on the channel of the peak hold transistor PH, increase in noise due to the positive feedback does not occur.

Figure 5:
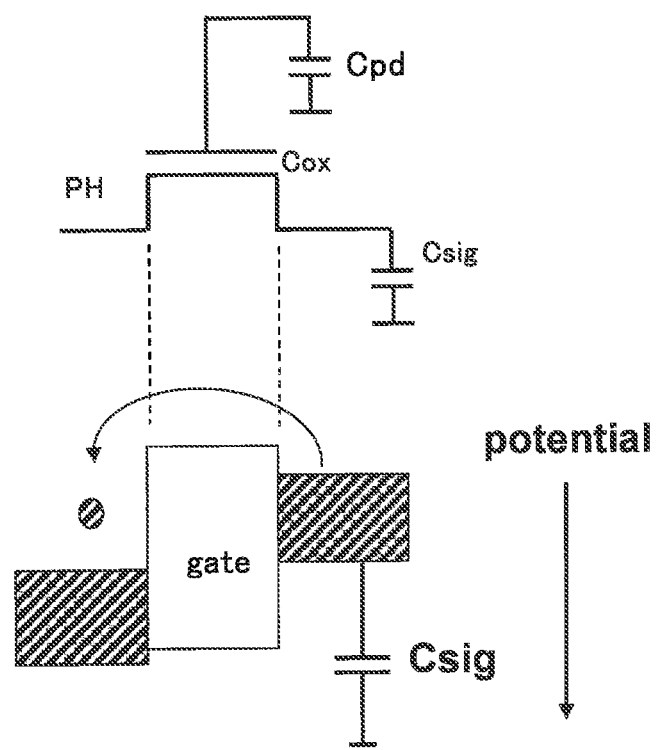
FIG. 5 is a diagram illustrating a state where no charge (no electron) is present in a channel region.

FIG. 5 illustrates a state where no charge (no electron) is present in a channel region.

A current in a case where only one electron is present in the channel region is estimated. When one electron flows through a gate channel, the current is expressed as follows, $$I=kT*(\mu e/L^2).$$

where k is the Boltzmann constant, T is the absolute temperature, μe is mobility of the electron, and L is a gate length of the peak hold transistor PH (MOSFET in this case).

When L=1 μm and μe=0.02 m²/V/s are assumed, the current value is about 10 nA. Accordingly, it is considered that, when the current (1 nA) is lower by one digit than the value, the peak hold circuit operates in the state where only one electron is present.

Note that the value L can be reduced to be less than or equal to 0.01 μm by a microfabrication technique in recent years, and the mobility μ e of the electron can be improved to about 0.15 m²/V/s. Therefore, even at the current of 1 nA or more, the peak hold circuit can perform sufficient operation with only one electron. Such a mode limited in charge is called a one carrier transfer mode.

Accordingly, when the peak hold circuit is operated at a level of about 1 nA, the peak hold circuit performs operation in the one carrier transfer mode, and increase in noise due to the positive feedback does not occur.

In such a state, the noise N=N in the limited band (in-phase) is established, and the noise N=((1/2)*kT/Csig)$^{1/2}$ in the full band is established.

In the present embodiment, the number of charges (electrons) present in the channel of the peak hold transistor PH is set to one or less. This makes it possible to suppress occurrence of the noise due to the positive feedback. In a case where the number of charges is limited as described above, the peak hold transistor PH performs the full band operation because the current value is small.

As described above, in the present embodiment, limiting this drain current out of the drain of the peak hold transistor PH in the circuit in FIG. 1 causes the peak hold circuit to perform operation in the one carrier transfer mode. This makes it possible to prevent increase in noise due to the positive feedback.

Embodiment 2

Figure 6:
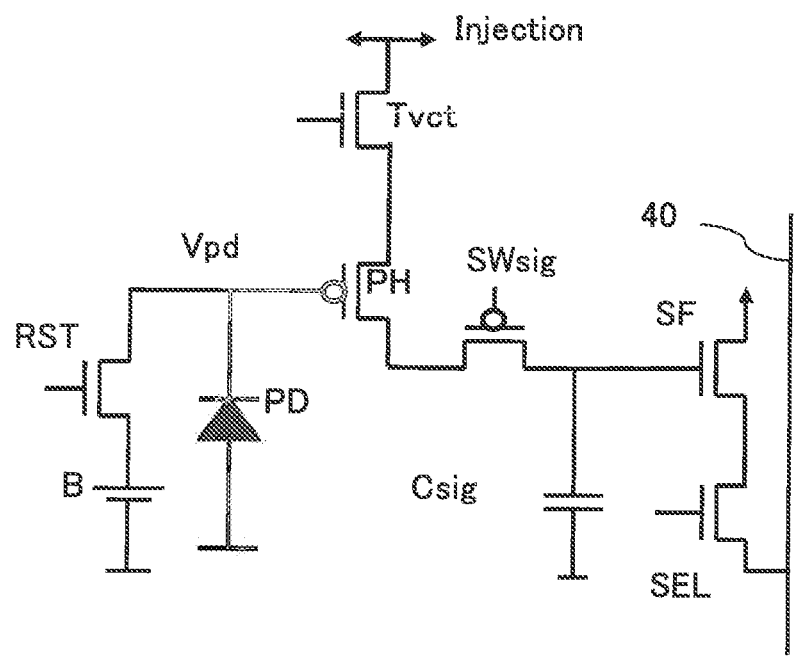
FIG. 6 is a circuit diagram in a case where charges (holes) are injected from a drain of a p-channel peak hold transistor PH to operate a peak hold circuit, where the amount of the injected holes is limited by Tvct transistor.
Figure 7:
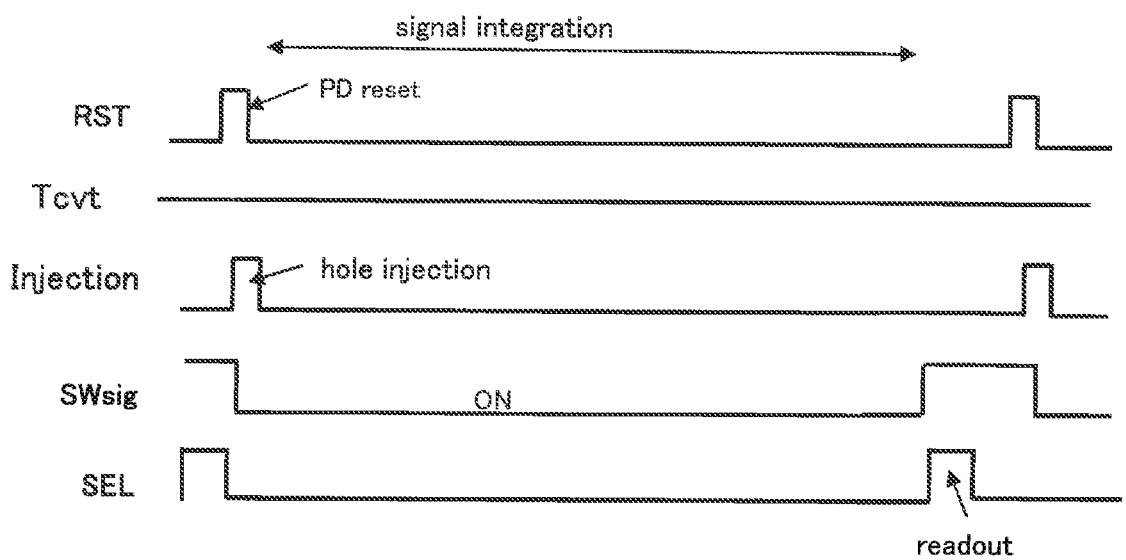
FIG. 7 is a timing chart illustrating operation of the circuit in FIG. 6.

FIG. 6 is a circuit diagram in a case where charges (holes) are injected from the drain of the p-channel peak hold transistor PH to operate the peak hold circuit. FIG. 7 is a timing chart illustrating operation of the circuit in FIG. 6.

In this example, the drain of the p-channel peak hold transistor PH is connected to an injection power supply Injection through a voltage control transistor Tvct. The source of the peak hold transistor PH is connected to the holding capacitor Csig and the gate of the source follower transistor SF through the switch transistor SWsig.

The reset transistor RST is turned on to reset the output of the photodiode PD. Next, the injection power supply Injection is set to an H level for a short period to supply the holes to the holding capacitor Csig through the peak hold transistor PH and the switch transistor SWsig.

After a signal integration period corresponding to one frame, the gate of the switch transistor SWsig is set to an H level (off for a p-channel transistor), and the selection transistor SEL is set to an H level (on). As a result, the signal voltage held in the holding capacitor Csig is output to the output line 40 through the source follower transistor SF and the selection transistor SEL.

At this time, if the drain voltage of the peak hold transistor PH is excessively high, the drain current is increased. In the present embodiment, the voltage control transistor Tvct is disposed between the injection power supply and the drain of the peak hold transistor PH. Further, the voltage control transistor Tvct performs control such that the drain voltage of the peak hold transistor PH does not become excessively high. This makes it possible to reduce the charge amount injected into the peak hold transistor PH, and to realize operation in the one carrier transfer model.

Configuration of Image Sensor

Figure 8:
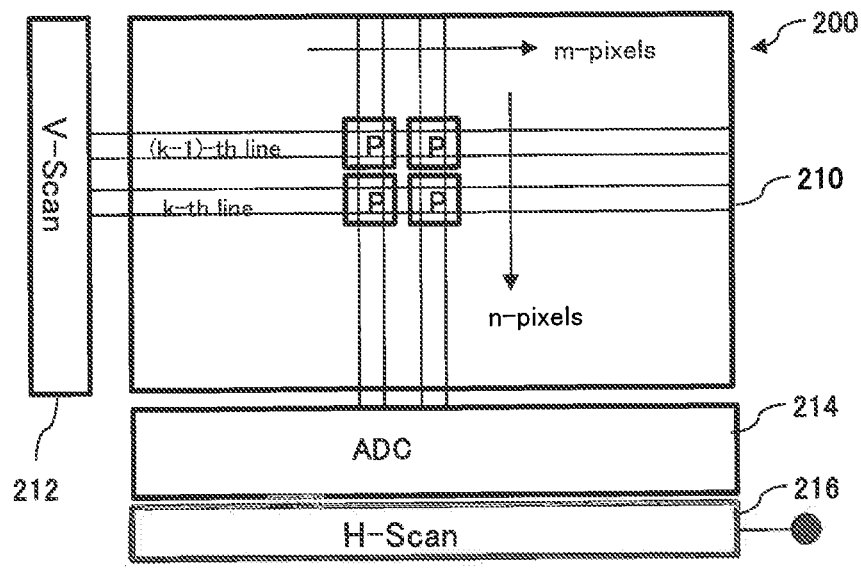
FIG. 8 is a diagram illustrating an image sensor in which pixels according to an embodiment are two-dimensionally arranged.

FIG. 8 is a diagram illustrating an image sensor 200 in which the pixels according to any of the embodiments are two-dimensionally arranged. A pixel array 210 includes pixels P as described above arranged in m columns*n rows (m*n), namely, includes m pixels in a horizontal direction and n pixels in a vertical direction. A vertical scan circuit (V-Scan) 212 sequentially selects rows of the pixels in a vertical direction. The pixels in each column are connected to a respective analog-to-digital converter (ADC) 214 by a respective readout line in the vertical direction. A horizontal scan circuit (H-Scan) 216 is connected to the analog-to-digital converter (ADC) 214, and image signals of the respective pixels are sequentially output from the horizontal scan circuit (H-Scan) 216.

Figure 9:
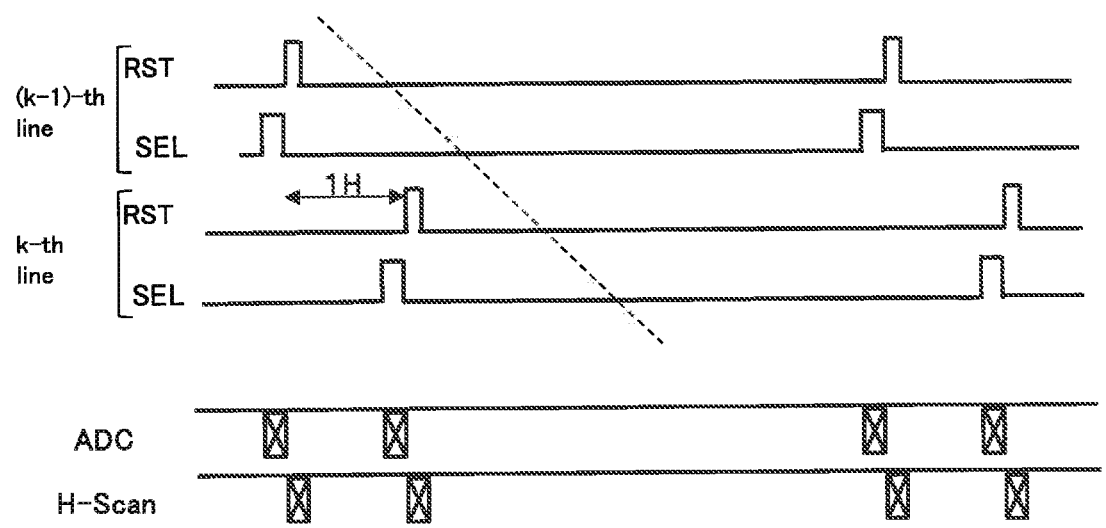
FIG. 9 is a timing chart illustrating operation of the image sensor in FIG. 8.

FIG. 9 is a timing chart illustrating operation of the image sensor in FIG. 8. A timing chart of the injection power supply Injection and SWsig illustrated in FIG. 7 are omitted.

In a (k−1)-th row, the reset transistor RST is turned on to reset the photodiode PD. The reset is performed for each vertical period (=1 frame period). Further, exposure starts after one reset. In addition, the signal is read out shortly before next reset. As described above, the selection transistor SEL is turned on, and the signal accumulated in the holding capacitor Csig is read out to the output line 40. The control is performed in response to a signal from the vertical scan circuit V-scan. The readout signal is supplied to the analog-to-digital converter ADC and is converted into a digital signal. The operation is simultaneously performed on the m pixels in one horizontal line. Thereafter, the horizontal scan circuit H-scan sequentially outputs the digital signals of the m pixels.

Next, the same operation is performed on a k-th row by shifting the horizontal period by 1H. Signals of all of the m*n pixels can be read out by repeating the operation n times.

Embodiment 3

Figure 10:
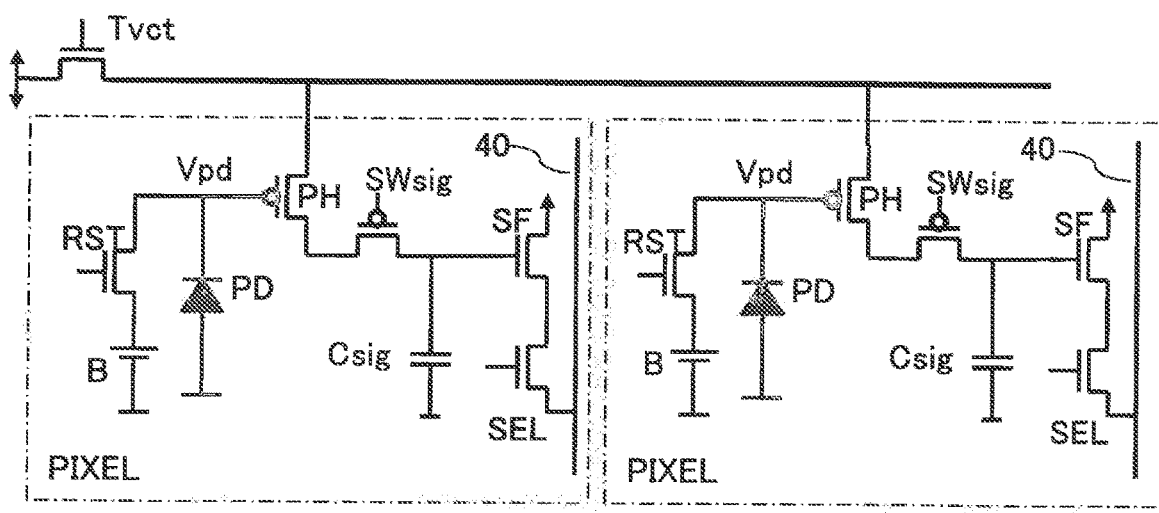
FIG. 10 is a diagram illustrating a configuration in a case where a plurality of pixels in FIG. 6 are provided, and illustrates two pixels.

FIG. 10 is a diagram illustrating a configuration in a case where a plurality of pixels in FIG. 6 are provided, and illustrates two pixels.

As illustrated, the drains of the peak hold transistors PH of the plurality of pixels in one row are connected to one voltage control transistor Tvct. Accordingly, one voltage control transistor Tvct can control the drain voltages of the peak hold transistors PH of the plurality of pixels.

Note that the number of pixels controlled by one voltage control transistor Tvct is optional, and for example, all of the pixels in one row may be controlled by one voltage control transistor Tvct.

Embodiment 4

Figure 11:
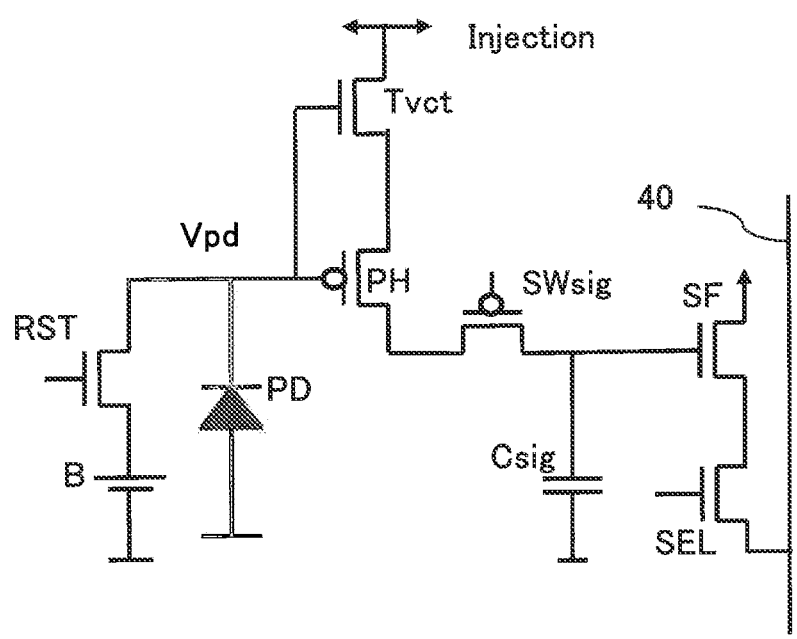
FIG. 11 is a diagram illustrating another configuration of the pixel circuit.

FIG. 11 is a diagram illustrating a configuration according to an embodiment 4. A basic configuration is the same as in FIG. 6. In this example, however, a gate of the voltage control transistor Tvct is connected to the output end of the photodiode PD. Therefore, a gate voltage of the voltage control transistor Tvct is varied corresponding to the output of the photodiode PD together with the gate of the peak hold transistor PH. This makes it possible to eliminate influence of voltage variation in output of the photodiode PD.

Embodiment 5

Figure 12:
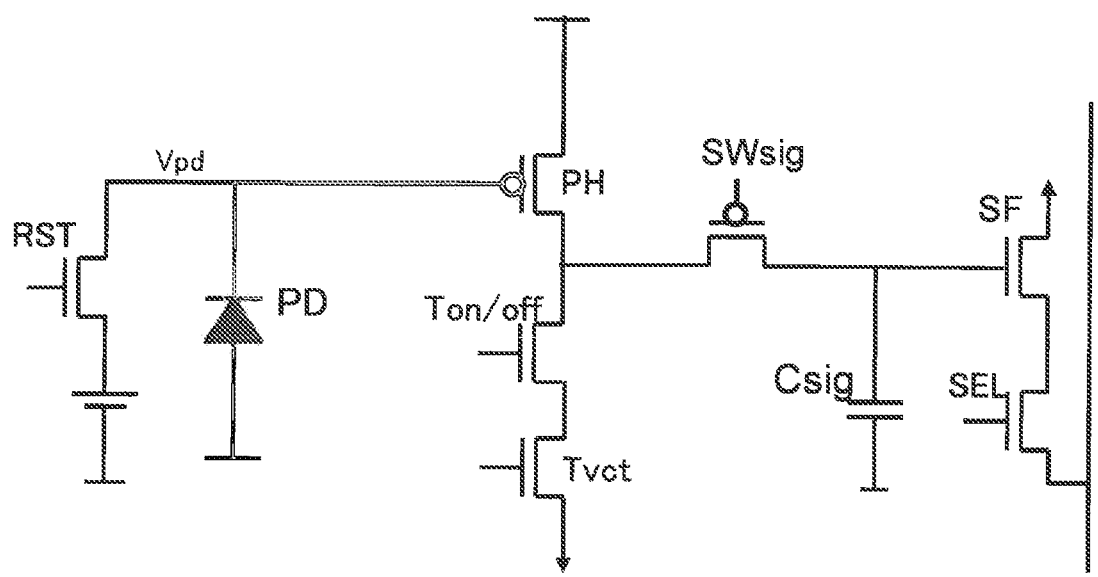
FIG. 12 is a diagram illustrating still another configuration of the pixel circuit.

FIG. 12 is a diagram illustrating a configuration according to an embodiment 5. In this example, holes are injected from the source side of the peak hold transistor PH.

The source of the peak hold transistor PH is connected to the power supply through an on/off transistor Ton/off and the voltage control transistor Tvct.

In this circuit, after the holes are injected into the holding capacitor Csig through the peak hold transistor PH and the switch transistor SWsig, the on/off transistor Ton/off is turned on, and the source voltage of the peak hold transistor PH is controlled by the voltage control transistor Tvct. In other words, the number of charges on the channel is reduced to one or less by controlling the source voltage of the peak hold transistor PH to a predetermined value, thereby causing operation in the one carrier transfer mode.

Embodiment 6

Figure 13:
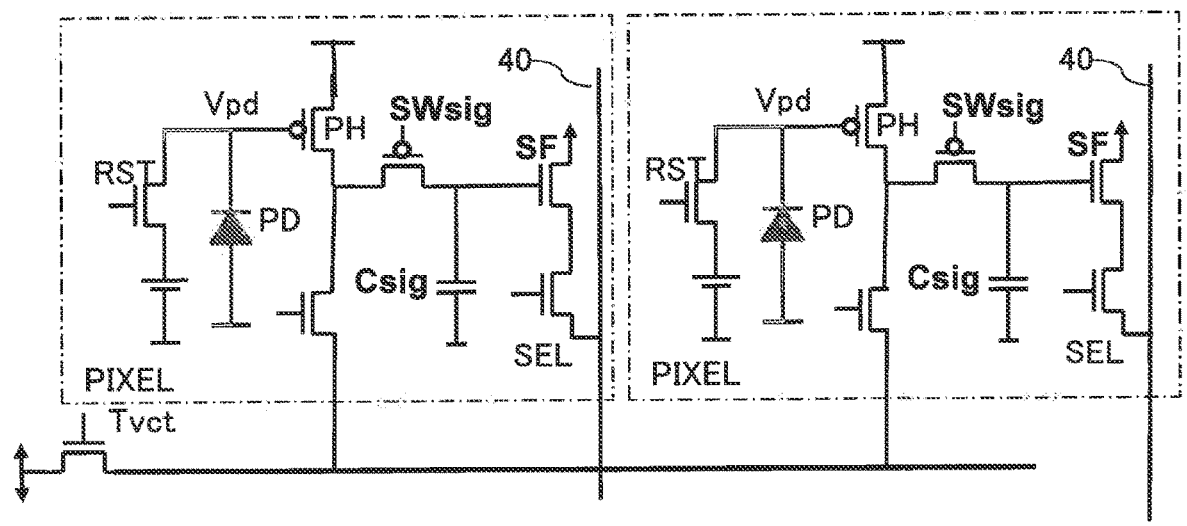
FIG. 13 is a diagram illustrating a configuration in a case where a plurality of pixels in FIG. 12 are provided, and illustrates two pixels.

FIG. 13 is a diagram illustrating a configuration in a case where a plurality of pixels in FIG. 12 are provided, and illustrates two pixels. As illustrated, the sources of the peak hold transistors PH of the plurality of pixels are connected to one voltage control transistor Tvct. Accordingly, the source voltages of the peak hold transistors PH of the plurality of pixels can be controlled by one voltage control transistor Tvct.

Other Effects

Figure 14:
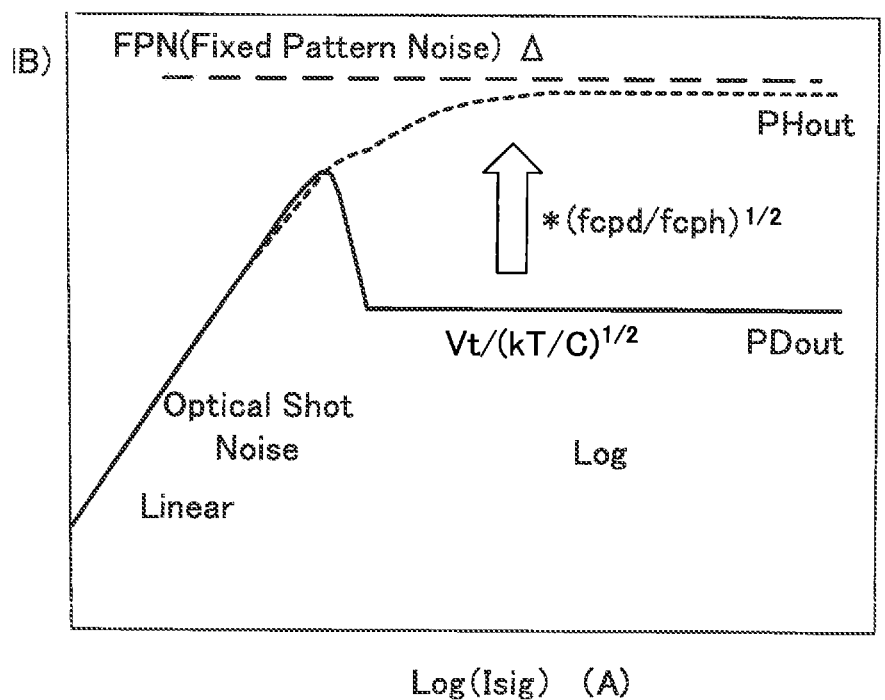
FIG. 14 is a diagram illustrating relationship of an output PDout of a photodiode PD, a signal current of an output PHout of the peak hold circuit, and S/N.

FIG. 14 is a diagram illustrating relationship of an output PDout of the photodiode PD, a signal current of an output PHout of the peak hold circuit, and S/N.

Thermal noise of the photodiode PD depends on the signal current and has a wide noise bandwidth. According to a prior art (Yang Ni. New Imaging Technologies, France, "QLOG-Logarithmic CMOS Pixel with Single Electron Detection Capability" Proceedings of the 2017 International Image Sensor Workshop, Hiroshima, Japan, 30 May-2 Jun. 2017), S/N of the photodiode PD has a constant value in a Log region (illustrated by solid line in FIG. 14). According to the prior art, in a case where the capacitance Cpd of the photodiode PD is 1 fF, S/N is 29 dB that is not a good value.

In a case where the peak hold circuit operates in the one carrier transfer mode as in the present embodiment, the operation bandwidth is narrowed. Therefore, the noise is reduced by band limitation, and when the signal is acquired through the peak hold circuit, S/N is improved (illustrated by dashed line in FIG. 14).

Therefore, according to the present embodiment, a clear image can be obtained in a region where the signal current is large.

In the drawing, "fcph" is a cutoff frequency of the peak hold circuit, and "fcpd" is a cutoff frequency of the photodiode PD.

What is claimed is:

1. A pixel circuit, comprising:
   a photodiode configured to operate in a photovoltaic mode and to accumulate charges corresponding to an incident light amount;
   a reset transistor configured to reset the accumulated charges of the photodiode; and
   a peak hold circuit configured to hold an output corresponding to the accumulated charges of the photodiode, the peak hold circuit including a peak hold transistor connected to an output end of the photodiode, a switching transistor configured to turn on/off an output of the peak hold transistor, and a holding capacitor configured to hold an output of the switching transistor, wherein
   the peak hold transistor operates in a state where no carrier charge or only one carrier charge is present on a channel of the peak hold transistor, and wherein
   the peak hold transistor operates under a condition that a drain current is less than or equal to $kT^*\mu e/L^2$ while no charge or only a single charge is present on the channel of the peak hold transistor, where k is a Boltzmann constant, T is an absolute temperature, $\mu e$ is mobility of an electron, and L is a gate length of the peak hold transistor.

2. The pixel circuit according to claim 1, wherein
   the peak hold transistor is a p-channel transistor, and includes a drain connected to a voltage control transistor, and
   injection of charges is controlled by adjusting a drain voltage of the peak hold transistor.

3. The pixel circuit according to claim 1, wherein
   the peak hold transistor is a p-channel transistor, and includes a source connected to a voltage control transistor, and
   injection of charges is controlled by adjusting a source voltage of the peak hold transistor.

4. The pixel circuit according to claim 2, wherein
   the voltage control transistor includes one end connected to an injection power supply supplying charges for resetting the holding capacitor, and another end connected to the drain of the peak hold transistor, and
   charges from the injection power supply are supplied to the holding capacitor through the voltage control transistor and the peak hold transistor.

5. The pixel circuit according to claim 3, wherein
   the voltage control transistor includes one end connected to a predetermined negative power supply, and another end connected to the source of the peak hold transistor, and
   the peak hold transistor is source-follower driven to supply charges from the gate of the peak hold transistor to the holding capacitor.

6. An image sensor, comprising:
   a plurality of pixels;
   a plurality of analog-to-digital converters; and
   a horizontal scan circuit, wherein
   each of the pixels includes a photodiode configured to operate in a photovoltaic mode and to accumulate charges corresponding to an incident light amount, a reset transistor configured to reset the accumulated charges of the photodiode, and a peak hold circuit configured to hold an output corresponding to the accumulated charges of the photodiode, wherein the peak hold circuit including a peak hold transistor connected to an output end of the photodiode, a switching transistor configured to turn on/off an output of the peak hold transistor, and a holding capacitor configured to hold an output of the switching transistor, and a source follower circuit configured to output a voltage held in the holding capacitor of the peak hold circuit as a signal voltage, the peak hold transistor operates under a condition that a drain current is less than or equal to $kT*\mu e/L^2$ while no charge or only a single charge is present on a channel of the peak hold transistor, where k is a Boltzmann constant, T is an absolute temperature, $\mu e$ is mobility of an electron, and L is a gate length of the peak hold transistor, the analog-to-digital converter converts the signal voltages output from the source-follower circuits of the plurality of pixels into digital signals, and the horizontal scan circuit serially outputs the digital signals.

7. A pixel circuit, comprising:

a photodiode configured to operate in a photovoltaic mode and to accumulate charges corresponding to an incident light amount;

a reset transistor configured to reset the accumulated charges of the photodiode; and a peak hold circuit configured to hold an output corresponding to the accumulated charges of the photodiode, the peak hold circuit including a peak hold transistor connected to an output end of the photodiode, a switching transistor configured to turn on/off an output of the peak hold transistor, and a holding capacitor configured to hold an output of the switching transistor, wherein the peak hold transistor operates in a state where no carrier charge or only one carrier charge is present on a channel of the peak hold transistor, and wherein the peak hold transistor is a p-channel transistor, and includes a drain connected to a voltage control transistor, and injection of charges is controlled by adjusting a drain voltage of the peak hold transistor, and wherein the voltage control transistor includes one end connected to an injection power supply supplying charges for resetting the holding capacitor, and another end connected to the drain of the peak hold transistor, and charges from the injection power supply are supplied to the holding capacitor through the voltage control transistor and the peak hold transistor.

* * * * *